May 22, 1923.
D. W. L. FRANK
LEVEL AND PLUMB
Filed April 9, 1921
1,456,431
2 Sheets-Sheet 1
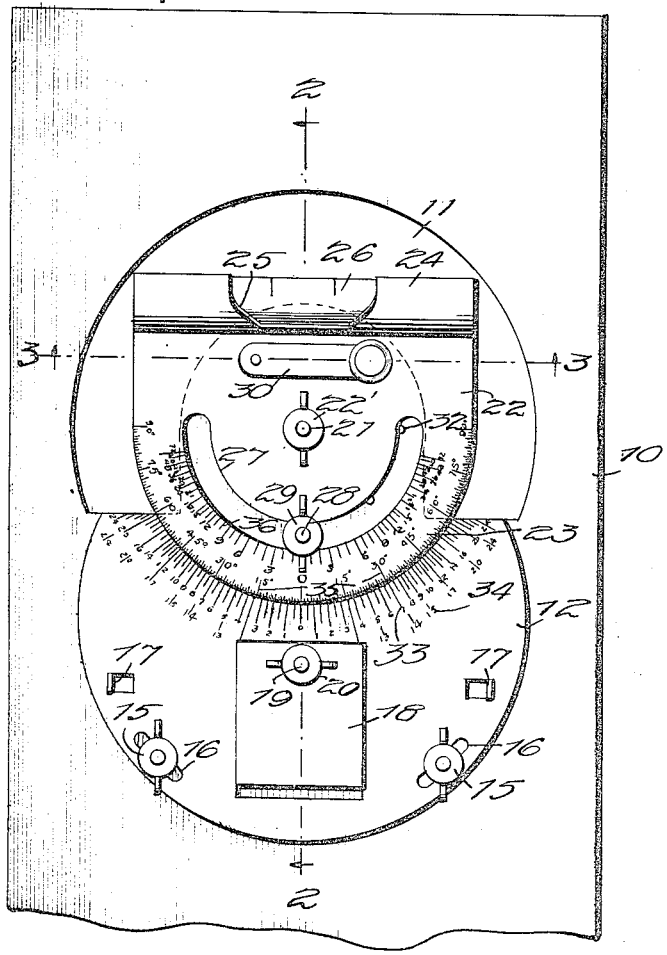
FIG_1_
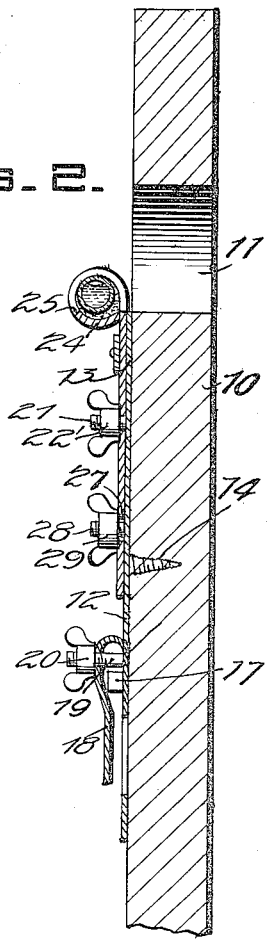
FIG_2_
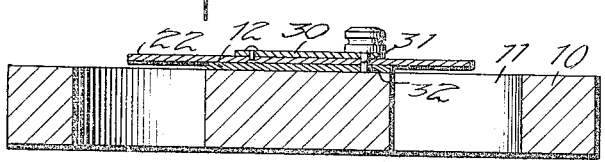
FIG_3_
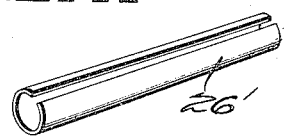
FIG_4_
WITNESSES:
J. H. Phillips
INVENTOR
Daniel W. L. Frank,
BY
Munn & Co.
ATTORNEYS May 22, 1923.
D. W. L. FRANK
LEVEL AND PLUMB
Filed April 9 1921
1,456,431
2 Sheets-Sheet 2
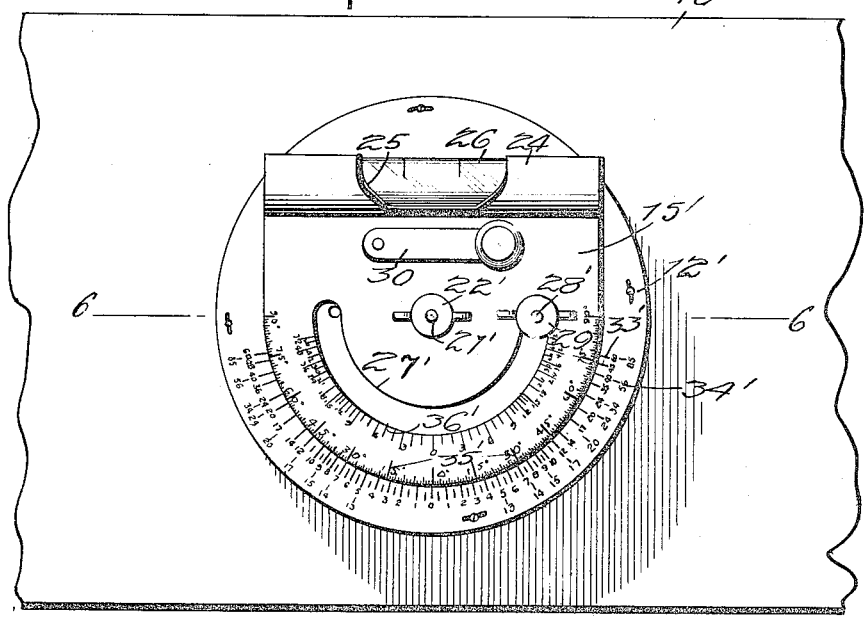
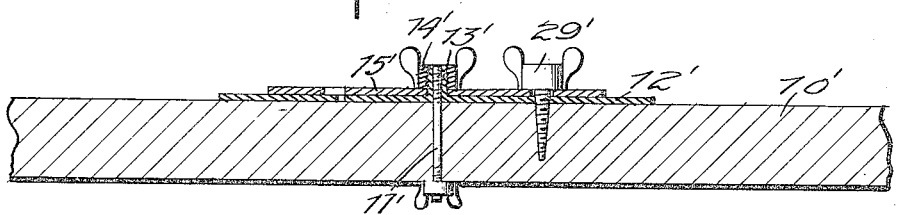
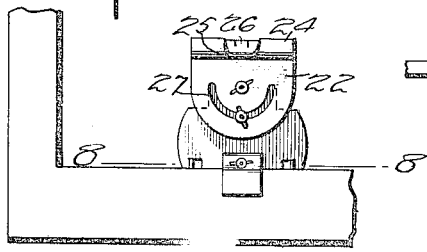 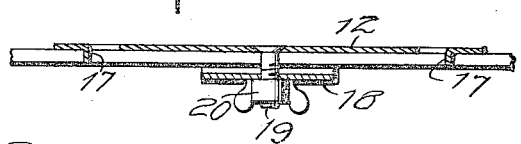
WITNESSES:
J. F. Phillips
INVENTOR
Daniel W. L. Frank,
BY
ATTORNEYS Patented May 22, 1923.

1,456,431

UNITED STATES PATENT OFFICE.

DANIEL W. L. FRANK, OF CHICAGO, ILLINOIS.

LEVEL AND PLUMB.

Application filed April 9, 1921. Serial No. 460,010.

*To all whom it may concern:*

Be it known that I, DANIEL W. L. FRANK, a citizen of the United States, and a resident of Chicago, in the county of Cook and State of Illinois, have invented an Improvement in Levels and Plumbs, of which the following is a specification.

This invention is an improvement in measuring instruments and has particular reference to a novel construction of levels and plumbs.

An object of the invention is the provision of a construction which is equally adapted for application with a straight edge or square whereby to secure proper levels and plumbs and to determine the degree, pitch, slope or angle of any surface or surfaces. To this end the invention contemplates providing a base plate adapted to be attached to a straight edge or square and has superposed thereon an adjustable plate carrying a spirit tube, each of said plates having graduations thereon which cooperate in order to ascertain the angles of deviation and distances between determined points or to adjust a surface to a given pitch or angle.

Another object of the invention is to provide a novel means for connecting the base plate to a square and also to retain the adjustable plate in certain of its adjusted positions.

The inventive idea involved is capable of receiving a variety of mechanical expressions, some of which, for the purpose of illustrating the invention, are shown in the accompanying drawings, in which—

Figure 1 is a plan view of a preferred form of the invention showing the same applied to a straight edge or levelling board.

Figure 2 is a section on the line 2—2 of Figure 1.

Figure 3 is a section on the line 3—3 of Figure 1.

Figure 4 is a detail perspective view of a protective casing for the spirit tube when the same is not in use.

Figure 5 is a plan view of a modified form of the invention.

Figure 6 is a section on the line 6—6 of Figure 5.

Figure 7 is a reduced view of the embodiment shown in Figure 1 illustrating the same applied to a square.

Figure 8 is a section on the line 8—8 of Figure 7.

Referring to the drawings and more particularly to Figures 1 to 4 inclusive, the numeral 10 indicates a straight edge or levelling board having an arcuate opening 11 adjacent one end thereof whereby to facilitate the handling of the same and also permit of observation of the spirit tube from either side of the board.

The invention proper comprises a substantially circular base plate 12 which is made of any suitable material such as brass and reduced upon its edge to provide an offset portion 13. Substantially at the center of the base plate the same is provided with a screw 14 which may be employed in securing said plate to the board 10. The said plate is accurately positioned with respect to the board 10 by means of set screws 15 which engage in the slots 16 formed adjacent the periphery of said plate, said set screws being adapted to tightly engage the plate in order to prevent accidental displacement thereof. The construction shown in Figure 1 is also adapted for use on a square, as shown in Figure 7, and when employed in this connection out-struck lugs 17 are utilized and adapted to rest against the edge of the square in order to accurately position the plate 12 thereon. In order to secure the plate in position the same is provided with an offset spring clip 18, preferably formed integral with the plate 12. This clip 18 engages over the face of the square and has associated therewith a bolt 19 upon which is mounted a winged nut 20 for the purpose of exerting pressure on said clip in order to cause the same to tightly engage the square. Centrally of the offset portion 13 the same is provided with a threaded pivot post 21 upon which is pivoted the superposed adjustable plate 22, a wing nut 22' being mounted upon said bolt 21 whereby to retain said plate in adjusted position.

The plate 22 is provided with a rounded end 23 and has located at its other end a spirit tube 24 which is cut away as indicated at 25 in order that the bubble in the glass 26 will be visible from both sides of the tube and also when looking upwardly should the device be held above the head of the operator. When the device is not in use, a split sleeve 26', shown in Figure 4 is mounted over the spirit tube 24 in order to protect the glass 26 from injury. Formed concentrically with the rounded end 23 of the plate 22 the same is provided with a slot 27 through which projects a small threaded bolt 28 having a winged nut 29 mounted thereon which, like the winged nut 22', is also employed for securing the plate 22 in an adjusted position. A spring arm 30 is secured at one end of the plate 22 and is provided at its other end with a small pin 31 which projects through the plate 22 and is adapted to engage in one of a series of small openings 32 formed in the offset portion 13 of the base plate 12 whereby the plate 22 is releasably located in certain predetermined positions of adjustment, it being necessary to withdraw said pin from engagement with the opening when it is desired to again adjust the plate.

Adjacent the rounded end 23 of the plate 22, the base plate 12 is provided with an inner and outer series of graduations 33 and 34, respectively, the former indicating the amount of deviation from a base line in proportion to a certain given unit while the latter indicates the length of the hypotenuse formed by said base line and a line indicating the length of said deviation. The rounded end 23 of the plate 22 is provided upon its outer edge with a degree scale 35 and upon the outer edge of the slot 27 with a graduation 36 similar to the graduation 33.

By way of illustrating one of the many uses to which the invention may be adapted, let it be assumed that it is desired to mount a diagonal brace between a floor and a certain point on a vertical joist and let it also be assumed that the distance from the base of the joist to the point of attachment of the brace to the floor should be 12 feet. Under such conditions it is essential to ascertain the length of the brace necessary in order to connect the same to the point on the joist and the angles at which the ends of said brace must be beveled in order to snugly fit against the joist and floor. The straight edge 10 is first sighted along the line connecting the two points of attachment and the adjustable plate 22 is then moved to the right or left, as the case may be, until the bubble in the spirit tube shows in the center of the glass, after which the plate 22 is secured in its adjusted position. Now assuming that the distance from the base of the joist to the point of attachment of the brace thereto is 7 feet. The zero mark on the scale 35 of the said plate 22 will then register with the mark 7 on the scale 33 of the base plate 12. In order to determine the length of the brace, reference is had to the scale 34 and it will be seen that the zero mark of the scale 35 will register with 14 on said scale 34 which indicates that the brace should be 14 feet long. By further reference to the scales 33 and 35 it will be seen that the zero mark on the former scale will register with the 30° mark on the latter scale indicating that the angle between the floor and brace is 30° which necessarily results in the angle between the joist and brace being 60°. Thus the length of the brace and the angles of the same relative to the joist and floor are accurately determined.

Referring now to Figures 5 and 6 there is shown a construction which is exclusively adapted for use in connection with a straight edge 10' having a bolt 11' extending therethrough upon which is mounted a circular base plate 12' which is centrally provided with a lateral threaded portion 13' upon which is mounted a winged nut 14' adapted to secure the adjustable plate 15' in any of its adjusted positions. The plate 12' is provided with graduated scales 33' and 34' similarly to the plate 12 in the embodiment shown in Figure 1. The adjustable plate 15' is identical in construction with the plate 22 and has the graduated scales 35' and 36' indicated thereon. Angles of deviation and distances between determined points are ascertained, with the construction shown in Figure 5, in the same manner as described above.

What is claimed is:—

1. In a device of the character described, in combination with a supporting element, a base plate mounted thereon and having a plurality of arcuate series of graduations thereon, an adjustable plate superposed on said base plate and having an arcuate edge provided with a plurality of series of graduations cooperable with the graduations of said base plate, a levelling device mounted upon the end of said adjustable plate opposite to the arcuate edge thereof, means for pivotally supporting the adjustable plate on the base plate, and means for retaining the adjustable plate in adjusted position.

2. In a device of the character described, a base plate having an arcuate series of graduations thereon, an adjustable plate superposed on said base plate and having an arcuate edge provided with graduations cooperable with the graduations of the base plate, a levelling device carried by the adjustable plate, a threaded pivot post rigidly connected to said base plate, said adjustable plate having a central opening in which said post is fitted, a wing nut threaded on said post and engaging the base plate, said adjustable plate being provided with an arcuate slot adjacent its arcuate edge and concentric therewith, a threaded bolt rigidly connected to the base plate and extending through said slot and a wing nut threaded on the bolt and engaging the adjustable plate.

3. In a device of the character described, a base plate having an arcuate series of graduations thereon, an adjustable plate superposed on said base plate and having an arcuate edge provided with graduations cooperable with the graduations of the base plate, a levelling device carried by the adjustable plate, means for pivotally connecting the adjustable plate to the base plate, said adjustable plate being provided with an arcuate slot adjacent its arcuate edge and concentric therewith, a threaded bolt rigidly connected to the base plate and extending through said slot, and a wing nut threaded on the bolt and engaging the adjustable plate.

4. In a device of the character described, a base plate having an arcuate series of graduations thereon, an adjustable plate superposed on said base plate and having an arcuate edge provided with graduations cooperable with the graduations of the base plate, a levelling device carried by the adjustable plate, means for pivotally connecting the adjustable plate to the base plate, said adjustable plate being provided with an arcuate slot adjacent its arcuate edge and concentric therewith, a threaded bolt rigidly connected to the base plate and extending through said slot, a wing nut threaded on the bolt and engaging the adjustable plate, a spring arm secured at one end to said adjustable plate and having a laterally projecting pin at its opposite end, said base plate being provided with a series of openings in which said pin is adapted to be selectively engaged.

5. In a device of the character described, in combination with a supporting element, a base plate mounted thereon and having a plurality of arcuate series of graduations thereon, an adjustable plate superposed on said base plate and having an arcuate edge provided with a plurality of series of graduations cooperable with the graduations of said base plate, a levelling device mounted upon the end of said adjustable plate opposite to the arcuate edge thereof, means for pivotally supporting the adjustable plate on the base plate, means for retaining the adjustable plate in adjusted position, out struck lugs carried by said base plate and adapted to engage the edge of the supporting element and an offset spring clip carried by the base plate between said out struck lugs and adapted to engage the supporting element on the opposite side thereof from the base plate, and means for urging said clip toward said base plate thereby binding the supporting element between the base plate and the clip.

DANIEL W. L. FRANK.

Witnesses:
Joe Burch,
H. F. Morrille.